United States Patent
Lin et al.

(10) Patent No.: US 9,851,836 B2
(45) Date of Patent: Dec. 26, 2017

(54) TOUCH DISPLAY DEVICE AND OPERATING METHOD THEREOF

(71) Applicant: PIXART IMAGING INC., Hsin-Chu County (TW)

(72) Inventors: Han-Shu Lin, Hsin-Chu County (TW); Yi-Hsien Ko, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 41 days.

(21) Appl. No.: 14/736,373

(22) Filed: Jun. 11, 2015

(65) Prior Publication Data

US 2016/0054844 A1 Feb. 25, 2016

(30) Foreign Application Priority Data

Aug. 19, 2014 (TW) .............................. 103128593 A

(51) Int. Cl.
*G06F 3/041* (2006.01)
*G06F 3/044* (2006.01)
*G06F 3/045* (2006.01)
*G09G 5/00* (2006.01)

(52) U.S. Cl.
CPC ............ *G06F 3/0416* (2013.01); *G06F 3/044* (2013.01); *G06F 3/045* (2013.01)

(58) Field of Classification Search
CPC combination set(s) only.
See application file for complete search history.

(56) References Cited

U.S. PATENT DOCUMENTS

| 8,724,038 B2* | 5/2014 | Ganapathi | G02B 26/0833 345/173 |
|---|---|---|---|
| 2012/0092350 A1* | 4/2012 | Ganapathi | G02B 26/0833 345/501 |
| 2012/0105081 A1 | 5/2012 | Shaikh et al. | |
| 2012/0182253 A1* | 7/2012 | Brosnan | G06F 3/0416 345/174 |
| 2013/0135247 A1 | 5/2013 | Na et al. | |
| 2015/0177884 A1* | 6/2015 | Han | G06F 3/044 345/174 |

FOREIGN PATENT DOCUMENTS

| TW | 201234282 A | 8/2012 |
|---|---|---|
| TW | 201312410 A1 | 3/2013 |

* cited by examiner

*Primary Examiner* — Carolyn R Edwards
*Assistant Examiner* — Deeprose Subedi
(74) *Attorney, Agent, or Firm* — Hauptman Ham, LLP

(57) ABSTRACT

There is provided a touch display device including a display and a touch control device. The display includes a glass substrate. The touch control device is attached to the glass substrate and includes a touch zone, a fingerprint detection zone and a control circuit. The touch zone includes a matrix of first detecting cells arranged at a first grid distance. The fingerprint detection zone includes a matrix of second detecting cells arranged at a second grid distance. The control circuit is configured to control detection operations of the touch zone and the fingerprint detection zone and to adjust an effective grid distance of the fingerprint detection zone according to a first detected touch position.

18 Claims, 3 Drawing Sheets

TOUCH DISPLAY DEVICE AND OPERATING METHOD THEREOF

RELATED APPLICATIONS

The present application is based on and claims priority to Taiwanese Application Number 103128593, filed Aug. 19, 2014, the disclosure of which is hereby incorporated by reference herein in its entirety.

BACKGROUND

1. Field of the Disclosure

This disclosure generally relates to a touch display device and, more particularly, to a touch display device having touch and fingerprint identification functions and an operating method thereof.

2. Description of the Related Art

With the popularity of digital devices, the security of digital information gradually becomes important as well. Traditionally, the method of asking the user to enter a password has the problem that the user password may be stolen by others and the user password is required to be changed by a new one every predetermined time interval for further increasing the security such that the password may be forgotten and it is not able to login the system.

In recent years, the physiological characteristic is gradually used as away to protect the digital information to replace the user password, wherein as a fingerprint is unique and convenient in operation, it can be used as an identification method for system login. However, as a separated fingerprint identification device is inconvenient in operation, the fingerprint identification device is preferably integrated with the computer peripheral devices for the user identification.

SUMMARY

Accordingly, the present disclosure further provides a touch display device including a touch panel with a built-in fingerprint detection function and an operating method thereof.

The present disclosure provides a touch display device whose fingerprint detection zone has both functions of touch detection and fingerprint detection and an operating method thereof.

The present disclosure further provides a touch display device and an operating method thereof that may adjust an effective grid distance of the fingerprint detection zone according to different operating conditions.

The present disclosure provides a touch display device including a display and a touch control device. The display includes a substrate. The touch control device is attached to the substrate and includes a touch zone, a fingerprint detection zone and a control circuit. The touch zone includes a matrix of first detecting cells arranged at a first grid distance. The fingerprint detection zone includes a matrix of second detecting cells arranged at a second grid distance. The control circuit is configured to control detection operations of the touch zone and the fingerprint detection zone, and to adjust an effective grid distance according to a first detected touch position.

The present disclosure further provides an operating method of a touch display device. The touch display device includes a touch zone and a fingerprint detection zone, and a grid distance of the touch zone is larger than that of the fingerprint detection zone. The operating method includes the steps of: identifying a first detected touch position; controlling the fingerprint detection zone to perform a fingerprint detection by a smallest grid distance when the first detected touch position is at the fingerprint detection zone; and controlling the fingerprint detection zone to perform a touch detection by an effective grid distance larger than the smallest grid distance when the first detected touch position is at the touch zone.

The present disclosure further provides a touch display device including a display and a touch control device. The display includes a substrate and an image display zone. The touch control device is attached to the substrate and opposite to the image display zone of the display. The touch control device includes a plurality of first transparent electrodes extending along a first direction; a plurality of second transparent electrodes extending along a second direction; a plurality of third transparent electrodes extending along the first direction and arranged opposite to a part of the image display zone and between at least two of the first transparent electrodes; a plurality of fourth transparent electrodes extending along the second direction and arranged opposite to the part of the image display zone and between at least two of the second transparent electrodes; and a control circuit coupled to the first transparent electrodes and the second transparent electrodes, and selectively coupled to the third transparent electrodes and the fourth transparent electrodes, wherein the control circuit determines whether the third transparent electrodes and the fourth transparent electrodes are coupled according to a first detected touch position.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
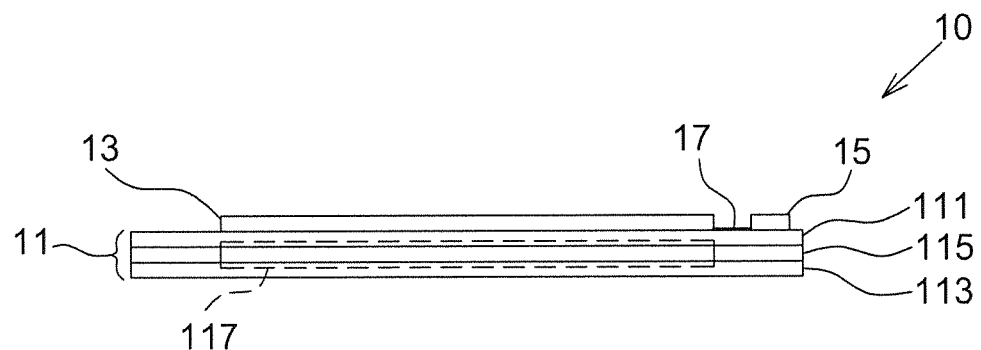
FIG. 1 is a schematic diagram of a touch display device according to one embodiment of the present disclosure.

Referring to FIG. 1, it is a schematic block diagram of a touch display device 10 according to one embodiment of the present disclosure. The touch display device 10 includes a display 11 and a touch control device 13, wherein the touch control device 13 is, for example, a capacitive touch control device or a resistive touch control device (taking the capacitive touch control device as an example herein), and is attached to the side of a display surface of the display 11. In other words, a user watches displayed images of the display 11 through the touch control device 13, and thus the touch control device 13 is preferably made of transparent materials, e.g. forming transparent electrodes (e.g. indium tin oxide) on a glass substrate or on a transparent plastic substrate. The display 11 is, for example, a liquid crystal display, a plasma display, an OLED display or the like without particular limitations. In the present disclosure a liquid crystal display is taken as an example for illustration.

A liquid crystal display includes a first glass substrate 111 and a second glass substrate 113 between which a liquid crystal layer 115 is sandwiched for controlling the light penetration, wherein the operating principle of a liquid crystal display is known to the art and thus details thereof are not described herein.

In one embodiment, the touch control device 13 is attached to the first glass substrate 111 and arranged opposite to an image display zone 117 (or called active area) of the display 11. For example, the touch control device 13 includes a transparent substrate and a plurality of transparent electrodes extending along a first direction (e.g. X-direction) and a second direction (e.g. Y-direction) to form the mutual capacitance therebetween, wherein the transparent electrodes are formed on a same side of or respectively on two sides of the transparent substrate without particular limitations. In addition, in some embodiments, the touch control device 13 may include only one transparent electrode layer which forms the mutual capacitance with respect to another transparent electrode (e.g. the common electrode) in the display 11. Accordingly, when a conductor 11 approaches the touch control device 13, the capacitance is changed such that the touch detection and the fingerprint detection are performed according to the capacitance variation.

The method of forming the transparent electrode layer on a transparent substrate to form the mutual capacitance touch sensor or the self capacitance touch sensor is known to the art, e.g. referring to the U.S. patent application No. 2012/0182253 assigned to the same assignee of the present application, the full disclosure of which is incorporated herein by reference.

It should be mentioned that although FIG. 1 shows that the touch control device 13 is directly disposed on the first glass substrate 111, the present disclosure is not limited thereto. The touch control device 13 may be combined with the first glass substrate 111 via other layer(s), e.g. a polarizing layer, a passivation layer and/or a dielectric layer.

Figure 2:
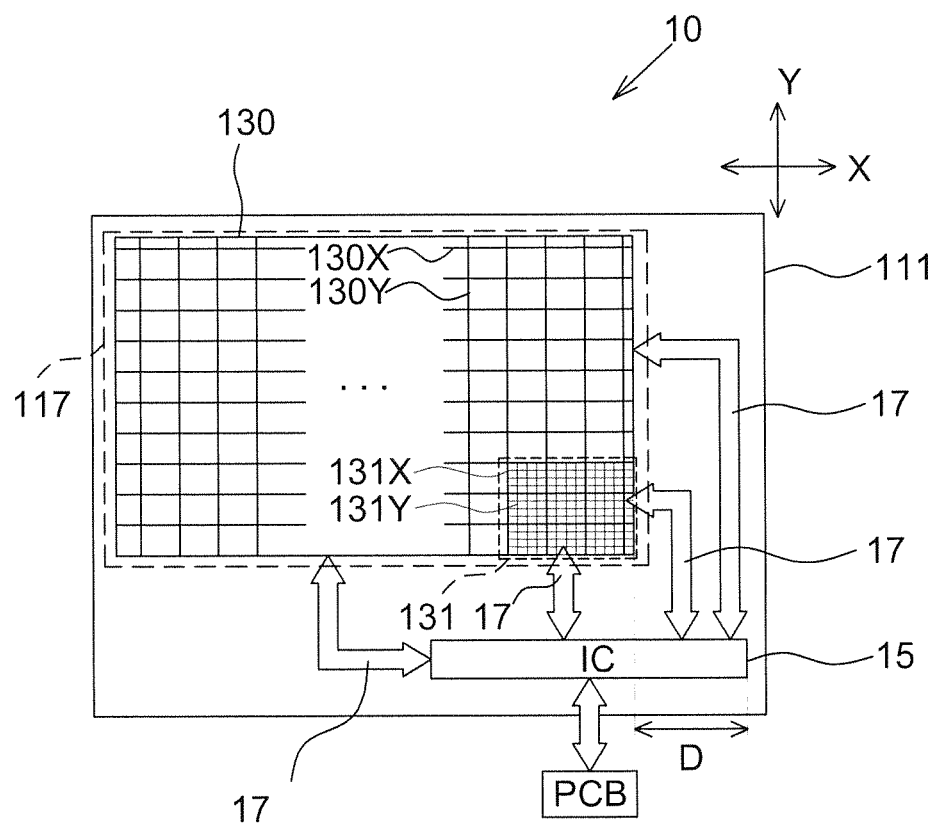
FIG. 2 is a schematic diagram of the component arrangement of a touch display device according to one embodiment of the present disclosure.

Referring to FIGS. 1 and 2 together, FIG. 2 is a schematic diagram of the component arrangement of the touch display device 10 according to one embodiment of the present disclosure. The touch control device 13 includes a touch zone 130, a fingerprint detection zone 131 and a control circuit (or control IC) 15, wherein the touch zone 130 and the fingerprint detection zone 131 are both arranged opposite to the image display zone 117, e.g. the touch zone 130 and the fingerprint detection zone 131 being opposite to corresponding regions of the image display zone 117 using a graphic user interface (GUI). It should be mentioned that a size of the touch zone 130 may be substantially identical to that of the image display zone 117, and for illustration purpose the touch zone 130 and the image display zone 117 are respectively shown in FIG. 2. In other embodiments, a scale relation between the touch zone 130 and the image display zone 117 is determined according to different applications without particular limitations.

The touch zone 130 includes a matrix of first detecting cells arranged at a first grid distance, wherein each of the first detecting cells is referred to the mutual capacitance formed by a pair of transparent electrodes. For example, the matrix of first detecting cells is formed by a plurality of first transparent electrodes 130X extending along a first direction (e.g. an X-direction) and a plurality of second transparent electrodes 130Y extending along a second direction (e.g. a Y-direction). Said first grid distance is referred to a pitch between the first transparent electrodes 130X and/or a pitch between the second transparent electrodes 130Y. For example, the first grid distance is between 1 mm and 10 mm, and the first grid distance is determined according to the panel size and the detecting resolution. In addition, the first grid distances along the X-direction and the Y-direction may be identical or different without particular limitations. In one embodiment, the X-direction is substantially perpendicular to the Y-direction.

The fingerprint detection zone 131 includes a matrix of second detecting cells arranged at a second grid distance, wherein each of the second detecting cells is referred to the mutual capacitance formed by a pair of transparent electrodes and arranged opposite to a part of the image display zone 117. For example, the matrix of second detecting cells is formed by a plurality of third transparent electrodes 131X extending along the first direction X and arranged opposite to a part of the image display zone 117 between at least two of the first transparent electrodes 130X, and a plurality of fourth transparent electrodes 131Y extending along the second direction Y and arranged opposite to the part of the image display zone 117 between at least two of the second transparent electrodes 130Y. For example, FIG. 2 shows that the third transparent electrodes 131X and the fourth transparent electrodes 131Y are formed between four of the first transparent electrodes 130X and four of the second transparent electrodes 130Y. It should be mentioned that numbers and positions of the third transparent electrodes 131X and the fourth transparent electrodes 131Y are determined according to different applications and are not limited to those shown in FIG. 2. For example, the fingerprint detection zone 131 may be opposite to a lower left corner, upper right corner or upper left corner of the image display zone 117. Similarly, said second grid distance is referred to a pitch between the third transparent electrodes 131X and/or a pitch between the fourth transparent electrodes 131Y. As the fingerprint detection zone 131 is used to detect a fingerprint, the second grid distance is much smaller than the first grid distance. For example, the second grid distance may be between 5 μm and 200 μm, and the second grid distance is determined according to the size and the detecting resolution of the fingerprint detection zone 131. In addition, the second grid distances along the X-direction and the Y-direction may be identical or different without particular limitations.

It should be mentioned that although FIG. 2 shows the fingerprint detection zone 131 including a part of the first transparent electrodes 130X and a part of the second transparent electrodes 130Y, the present disclosure is not limited thereto. According to different traces on the first glass substrate 111, the transparent electrodes of the fingerprint detection zone 131 may be independent from the transparent electrodes of the touch zone 130.

The control circuit 15 is configured to control, e.g. simultaneously or sequentially, detection operations of the touch zone 130 and the fingerprint detection zone 131. The control circuit 15 is electrically coupled to the transparent electrodes 130X, 131X, 130Y and 131Y via the traces 17 on the glass substrate 111. Said detection operations herein are referred to that the control circuit 15 inputs drive signals to the transparent electrodes 130X and 131X and receives capacitance variation signals, e.g. voltage variation signals or current variation signals, from the transparent electrodes 130Y and 131Y via the traces 17 such that the control circuit 15 performs the touch detection or the fingerprint detection according to the capacitance variation signals. That is, in this embodiment, the transparent electrodes 130X and 131X are served as drive electrodes and the transparent electrodes 130Y and 131Y are served as sensing electrodes. In other embodiments, the drive and sensing electrodes may be arranged inversely without particular limitations. Said drive signals are, for example, square waves, sinusoidal waves or other suitable signals.

In one embodiment, the control circuit 15 is directly formed on the glass substrate 111 through chip-on-glass (COG) technology or chip-on-film (COF) technology, and arranged opposite to a range outside of the image display zone 117 as shown in FIG. 2. The traces 17 may be formed on the glass substrate 111 using, for example, photolithography, and a part of the traces 17 may enter a range opposite to the image display zone 117. In one embodiment, the control circuit 15 is strip-shaped, which has a lower cost, and has a length direction, wherein the control circuit 15 is arranged to exceed an edge of the touch zone 130 (or the image display zone 117) by a predetermined distance D along the length direction. Accordingly, the portion of the predetermined distance D may be electrically connected to the transparent electrodes 130X and 131X directly via a plurality of parallel traces 17. The control circuit 15 is also coupled to a printed circuit board PCB (or a flexible printed circuit board, not limited to the PCB), which controls the operation of the display 11, so as to couple to the display 11. It should be mentioned that although FIG. 2 shows that the length direction of the control circuit 15 extends along the first direction X, in other embodiments the length direction of the control circuit 15 may extend along the second direction Y as long as the control circuit 15 exceeds an edge of the touch zone 130 by a predetermined distance D along the length direction.

For example, in one embodiment, the control circuit 15 is stably coupled to the first transparent electrodes 130X and the second transparent electrodes 130Y, but selectively coupled to the third transparent electrodes 131X and the fourth transparent electrodes 131Y by controlling a plurality of thin film transistors (not shown), wherein the thin film transistors are also formed on the glass substrate 111 using photolithography.

In the present disclosure, the control circuit 15 is further configured to adjust an effective grid distance of the fingerprint detection zone 131 according a first detected touch position, wherein said effective grid distance is referred to an effective pitch between the third transparent electrodes 131X to which the drive signals are actually inputted by the control circuit 15 and an effective pitch between the fourth transparent electrodes 131Y from which the sensing signals are actually read by the control circuit 15. Said first detected touch position is referred to a conductor firstly being detected in a non-sleep mode after the conductor is not detected for a predetermined time interval, wherein said predetermined time interval is shorter than a waiting time for entering a sleep mode. In some embodiments, in the sleep mode, the touch zone 130 may stop the detection function and start to operate after a user ID is logged in, and in this case the first detected touch position is at the fingerprint detection zone 131.

In one embodiment, the effective grid distance is adjustable by connecting all of or a part of the third transparent electrodes 131X and the fourth transparent electrodes 131Y. For example, during each scan period, the control circuit 15 sequentially drives the first transparent electrodes 130X and the coupled third transparent electrodes 131X, and sequentially reads the second transparent electrodes 130Y and the coupled fourth transparent electrodes 131Y. When numbers of the coupled third transparent electrodes 131X and the coupled fourth transparent electrodes 131Y are higher, the effective grid distance is smaller; whereas when numbers of the coupled third transparent electrodes 131X and the coupled fourth transparent electrodes 131Y are lower, the effective grid distance is larger. It is appreciated that the control circuit 15 preferably drives or connects to a part of the third transparent electrodes 131X equidistantly, and reads or connects to a part of the fourth transparent electrodes 131Y equidistantly.

In one embodiment, when identifying that the first detected touch position (e.g. T1 shown in FIG. 4) is at the fingerprint detection zone 131 (i.e. inside the third transparent electrodes 131X and the fourth transparent electrodes 131Y), the control circuit 15 controls the fingerprint detection zone 131 to perform the detection operation by the second grid distance, i.e. all the third transparent electrodes 131X being served as drive electrodes and all the fourth transparent electrodes 131Y being served as sensing electrodes, or vice versa. For example, the control circuit 15 is coupled to all the third transparent electrodes 131X and all the fourth transparent electrodes 131Y via a plurality of thin film transistors and a pitch between two of the third transparent electrodes 131X and/or a pitch between two of the fourth transparent electrodes 131Y is referred to the second grid distance in this embodiment.

In one embodiment, when identifying that the first detected touch position (e.g. T1 shown in FIG. 4) is at the touch zone 130 (i.e. outside the third transparent electrodes 131X and the fourth transparent electrodes 131Y), the control circuit 15 controls the fingerprint detection zone 131 to perform the detection operation by a third grid distance. In one embodiment, the control circuit 15 is not coupled to the third transparent electrodes 131X and the fourth transparent electrodes 131Y via the thin film transistors, i.e. all the third transparent electrodes 131X not served as drive electrodes and all the fourth transparent electrodes 131Y not served as sensing electrodes. In one embodiment, the control circuit 15 is coupled to a part of the third transparent electrodes 131X and a part of the fourth transparent electrodes 131Y via the thin film transistors. In some embodiments, the third grid distance is larger than the second grid distance, and is smaller than or equal to the first grid distance, and the third grid distance is referred to the effective grid distance in this embodiment.

Figure 4:
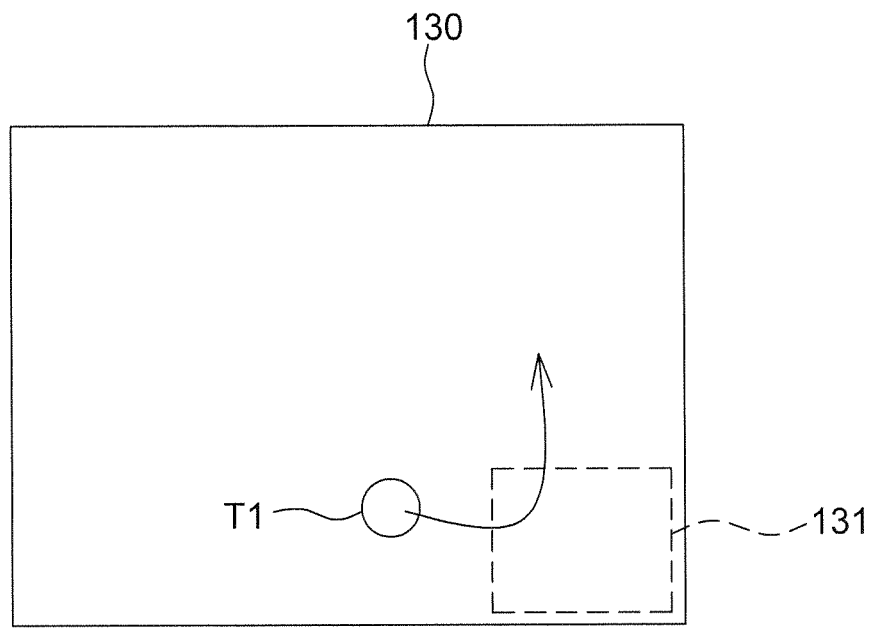
FIG. 4 is a schematic diagram of the operation of a touch display device according to one embodiment of the present disclosure.

In one embodiment, when identifying that successive touch positions enter the fingerprint detection zone 131 from the touch zone 130 (i.e. entering inside of from outside of the third transparent electrodes 131X and the fourth transparent electrodes 131Y) as shown in FIG. 4, the control circuit 15 controls the fingerprint detection zone 131 to perform the detection operation by a third grid distance. For example, the control circuit 15 is not coupled to the third transparent electrodes 131X and the fourth transparent electrodes 131Y via the thin film transistors, or coupled to a part of the third transparent electrodes 131X and a part of the fourth transparent electrodes 131Y via the thin film transistors. Accordingly, the fingerprint detection zone 131 is also served as a detection area of the touch operation.

In one embodiment, before the first detected touch position is detected, the control circuit 15 controls the fingerprint detection zone 131 to perform the detection operation by an initial grid distance, wherein the initial grid distance may be larger than the second grid distance, and is smaller than or equal to the first grid distance. Accordingly, the high power consumption when waiting for detecting the fingerprint is reduced.

Figure 3:
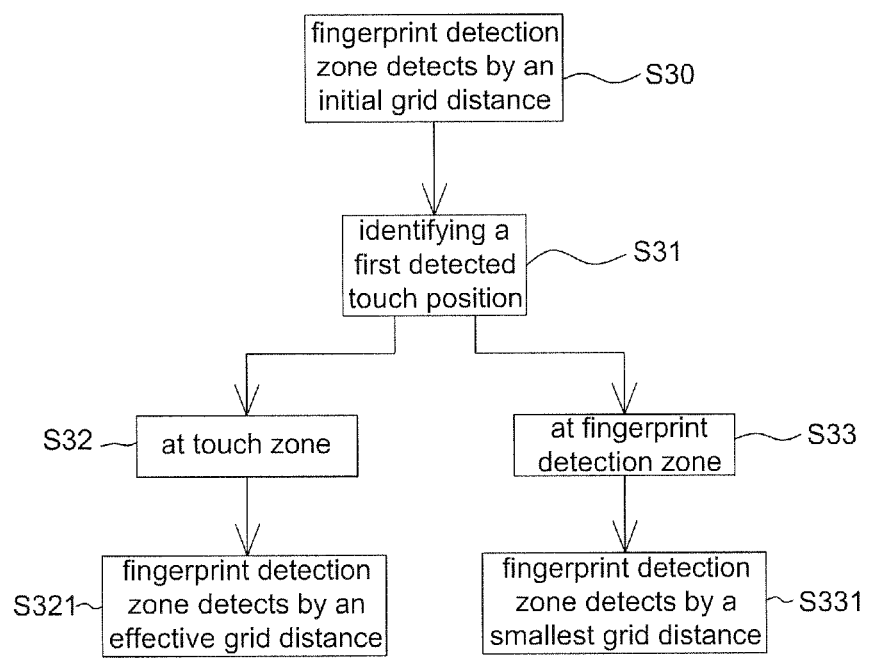
FIG. 3 is a flow chart of an operating method of a touch display device according to one embodiment of the present disclosure.

Referring to FIG. 3, it is a flow chart of an operating method of a touch display device according to one embodiment of the present disclosure, which includes the steps of: identifying a first detected touch position (Step S31); controlling a fingerprint detection zone to perform a fingerprint detection by a smallest grid distance when the first detected touch position is at the fingerprint detection zone (Step S33-S331); and controlling the fingerprint detection zone to perform a touch detection by an effective grid distance larger than the smallest grid distance when the first detected touch position is at a touch zone (Step S32-S321).

Step S31: In the non-sleep mode, the control circuit 15 may adjust an effective grid distance of the fingerprint detection zone 131 according to a first detected touch position (e.g. T1 in FIG. 4). Therefore, the control circuit 15 identifies the position of a first detected touch position T1 at first.

Step S33-S331: When the first detected touch position T1 is at the fingerprint detection zone 131, the control circuit 15 identifies that a user is desired to perform a fingerprint detection, and thus the control circuit 15 controls the fingerprint detection zone 131 to perform the fingerprint detection by a smallest grid distance. For example, in one embodiment, the control circuit 15 detects the first detected touch position T1 at the fingerprint detection zone 131 in a first scan period, and thus the grid distance is adjusted to the smallest grid distance in a next scan period, wherein the effective grid distance in the first scan period is larger than the smallest grid distance. In one embodiment, said smallest grid distance is referred to a physical pitch between transparent electrodes of the fingerprint detection zone 131 (e.g. the second grid distance), which has been illustrated above and thus details thereof are not repeated herein.

Step S32-S321: When the first detected touch position T1 is at the touch zone 130, the control circuit 15 identifies that the user is desired to perform a touch operation, and thus the control circuit 15 reduces the detecting resolution of the fingerprint detection zone 131 and controls the fingerprint detection zone 131 to perform the touch detection by an effective grid distance larger than the smallest grid distance, wherein the effective grid distance is determined according to an effective electrode pitch between the transparent electrodes actually driven by or coupled to the control circuit 15, which has been illustrated above and thus details thereof are not repeated herein.

In addition, when identifying that successive touch positions move to enter the fingerprint detection zone 131 from the touch zone 130, the control circuit 15 still identifies that the user is desired to perform a touch operation and controls the fingerprint detection zone 131 to perform the touch detection by the effective grid distance. However, when the control circuit 15 identifies that the conductor leaves the touch surface for a predetermined time and then enters the fingerprint detection zone 131, the control circuit 15 may determine that a first detected touch position is at the fingerprint detection zone 131 and perform the Steps S33-S331.

In addition, in order to reduce the total power consumption, in the operating method of the present embodiment, the fingerprint detection zone 131 is controlled to perform the touch detection by an initial grid distance in a scan period before the first detected touch position is detected, wherein the initial grid distance may be larger than the smallest grid distance, and is smaller than or equal to the grid distance of the touch zone 130. In a next scan period after the first detected touch position is detected, it is determined whether to adjust the effective grid distance according to the first detected touch position.

In other words, in the present disclosure, the control circuit 15 drives or couples all the transparent electrodes of the fingerprint detection zone 131 only when the first detected touch position in at the fingerprint detection zone 131. In other conditions, the control circuit 15 is coupled to only a part of or is not coupled to the transparent electrodes, e.g. the third transparent electrodes 131X and the fourth transparent electrodes 131Y, of the fingerprint detection zone 131.

Figure 5:
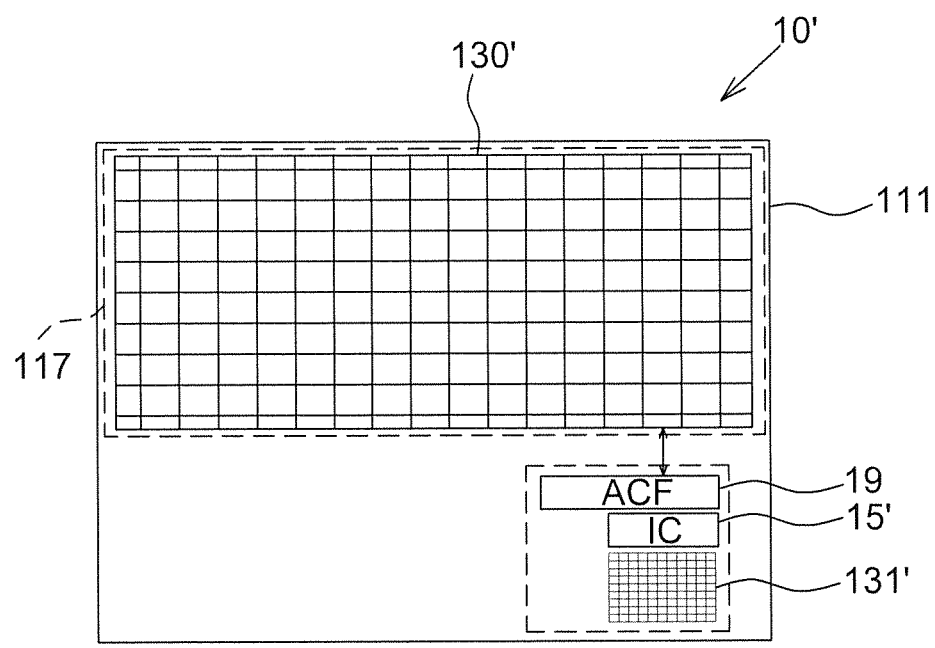
FIG. 5 is a schematic diagram of the component arrangement of a touch display device according to another embodiment of the present disclosure.

Referring to FIG. 5, it is a schematic diagram of the component arrangement of a touch display device 10' according to another embodiment of the present disclosure. The difference between FIG. 5 and FIG. 2 is that in FIG. 5 the fingerprint detection zone 131' is arranged on the first substrate 111 and opposite to a range (e.g. black zone) outside of the image display zone 117 of the display 11. Similarly, the control circuit 15' may also be directly formed on the glass substrate 111 by COG technology or COF technology, and coupled to the transparent electrodes of the touch zone 130' through a anisotropic conductive film (ACF) 19 to allow the control circuit 15' to control the detection operations of both the touch zone 130' and the fingerprint detection zone 131'. In other words, the touch zone 130' and the fingerprint detection zone 131' are arranged separately to allow the touch zone 130' to opposite to inside of the image display zone 117 of the display 11 and the fingerprint detection zone 131' to opposite to the frame of the display 11, i.e. the fingerprint detection zone 131' is formed by the mutual capacitance formed by transparent electrodes on another transparent substrate (different from the transparent substrate of the touch zone 130'). Similarly, a grid distance of the touch zone 130' is larger than a grid distance of the fingerprint detection zone 131'.

It should be mentioned that although the mutual capacitance touch sensor is taken as an example in the above embodiments, the present disclosure is not limited thereto. The present disclosure is also adaptable to the self capacitance touch sensor or resistive touch control device. The touch display device 10 of the present disclosure is adaptable to various digital data system, e.g. portable electronic devices or stationary electronic equipments, without particular limitations.

It should be mentioned that although the thin film transistors are taken as an example to illustrate the connection or disconnection between the control circuit 15 and the transparent electrodes 131X and 131Y in the above embodiments, the present disclosure is not limited thereto. The control circuit 15 may be selectively coupled to the transparent electrodes 131X and 131Y through the switching devices therein or by the signal control. In addition, although the glass substrate is taken as an example in the above embodiments, said substrate is not limited to the glass substrate and may be other substrate made of other transparent materials.

As mentioned above, as the fingerprint identification is unique and convenient in operation, it can be used to unlock a security lock of the digital information. Therefore, the present disclosure further provides a touch display device (FIGS. 2 and 4) and an operating method thereof (FIG. 3) that may adjust the detecting resolution of a fingerprint detection zone according to different initial touch positions such that the fingerprint detection zone has both functions of touch detection and fingerprint detection so as to improve the usability thereof.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A touch device comprising:
   a substrate; and
   a touch control device attached to the substrate and comprising:
      a touch zone comprising a matrix of first detecting cells coupled at a first grid distance along a direction parallel to a surface of the substrate;
      a fingerprint detection zone comprising a matrix of second detecting cells coupled at a second grid distance and a third grid distance along the direction parallel to the surface of the substrate, wherein the third grid distance is larger than the second grid distance; and
      a control circuit configured to initially control detection operations of the touch zone and the fingerprint detection zone by coupling the matrix of the first detecting cells with the first grid distance and the matrix of second detecting cells with the third grid distance, and then configured to control the detection operation of the fingerprint detection zone by coupling the matrix of second detecting cells with the second grid distance when a touch position is firstly detected in the fingerprint detection zone.

2. The touch device as claimed in claim 1, wherein the substrate forms a display, and the display comprises an image display zone to which the touch zone and the fingerprint detection zone are arranged opposite.

3. The touch device as claimed in claim 2, wherein the control circuit is formed on the substrate by chip-on-glass technology or chip-on-film technology, and is opposite to a region outside of the image display zone.

4. The touch device as claimed in claim 3, wherein the control circuit is stripe-shaped and has a length direction, and the control circuit is arranged to exceed an edge of the touch zone by a predetermined distance along the length direction.

5. The touch device as claimed in claim 1, wherein when identifying that the firstly detected touch position is at the touch zone, the control circuit controls the fingerprint detection zone to perform the detection operation by the third grid distance.

6. The touch device as claimed in claim 1, wherein when identifying that successive touch positions enter the fingerprint detection zone from the touch zone, the control circuit controls the fingerprint detection zone to perform the detection operation by the third grid distance.

7. The touch device as claimed in claim 5, wherein the third grid distance is smaller than or equal to the first grid distance.

8. An operating method of a touch device, the touch device comprising a touch zone and a fingerprint detection zone, and a first grid distance between coupled first detecting cells of the touch zone being larger than a grid distance between coupled second detecting cells of the fingerprint detection zone, the operating method comprising:
   identifying a firstly detected touch position by coupling the second detecting cells with an initial grid distance and coupling the first detecting cells with the first grid distance;
   controlling the fingerprint detection zone to perform a fingerprint detection by coupling the second detecting cells with a smallest grid distance, which is smaller than the initial grid distance, when the firstly detected touch position is at the fingerprint detection zone; and
   controlling the fingerprint detection zone to perform a touch detection by coupling the second detecting cells with an effective grid distance, which is larger than the smallest grid distance and smaller than or equal to the initial grid distance, when the firstly detected touch position is at the touch zone,
   wherein the first grid distance, the grid distance, the initial grid distance and the smallest grid distance are along a direction parallel to a surface of the touch zone and a fingerprint detection zone.

9. The operating method as claimed in claim 8, further comprising:
   controlling the fingerprint detection zone to perform the touch detection by coupling the second detecting cells with the effective grid distance when successive touch positions enter the fingerprint detection zone from the touch zone.

10. The operating method as claimed in claim 8, wherein the initial grid distance is smaller than or equal to the first grid distance of the touch zone.

11. A touch device comprising:
    a substrate having an image display zone; and
    a touch control device attached to the substrate and opposite to the image display zone, the touch control device comprising:
       a plurality of first transparent electrodes extending along a first direction parallel to a surface of the substrate;
       a plurality of second transparent electrodes extending along a second direction parallel to the surface of the substrate, wherein pitches between two adjacent first transparent electrodes and between two adjacent second transparent electrodes are first pitches;
       a plurality of third transparent electrodes extending along the first direction and arranged opposite to a part of the image display zone and between at least two of the first transparent electrodes;
       a plurality of fourth transparent electrodes extending along the second direction and arranged opposite to the part of the image display zone and between at least two of the second transparent electrodes, wherein pitches between two adjacent third transparent electrodes, between adjacent third and first transparent electrodes, between two adjacent fourth transparent electrodes and between adjacent fourth and second transparent electrodes are second pitches, and the second pitches are smaller than the first pitches; and
       a control circuit
          initially coupled to the first transparent electrodes and the second transparent electrodes, and
          then coupled to the first transparent electrodes, the second transparent electrodes, the third transparent electrodes and the fourth transparent electrodes when a touch position is firstly detected in the part of the image display zone.

12. The touch device as claimed in claim 11, wherein the control circuit is stripe-shaped and has a length direction, and the control circuit is arranged to exceed an edge of the image display zone by a predetermined distance along the length direction.

13. The touch device as claimed in claim 11, wherein the control circuit is formed on the substrate and selectively coupled to the third transparent electrodes and the fourth transparent electrodes by controlling a plurality of thin film transistors, wherein the control circuit is formed on the substrate by chip-on-glass technology or chip-on-film technology, and the thin film transistors are formed on the substrate by photolithography.

14. The touch device as claimed in claim 13, wherein when identifying that the firstly detected touch position is outside of the part of the image display zone overlapping the third transparent electrodes and the fourth transparent electrodes, the control circuit is not coupled to the third transparent electrodes and the fourth transparent electrodes via the thin film transistors.

15. The touch device as claimed in claim 13, wherein when identifying that the firstly detected touch position is inside of the part of the image display zone overlapping the third transparent electrodes and the fourth transparent electrodes, the control circuit is coupled to the third transparent electrodes and the fourth transparent electrodes via the thin film transistors.

16. The touch device as claimed in claim 13, wherein when identifying that successive touch positions enter inside of the part of the image display zone overlapping third transparent electrodes and the fourth transparent electrodes from outside of the part of the image display zone, the control circuit is not coupled to the third transparent electrodes and the fourth transparent electrodes via the thin film transistors.

17. The touch device as claimed in claim 1, wherein the control circuit is configured to change the coupling of the matrix of second detecting cells from the third grid distance to the second grid distance through switching devices.

18. The touch device as claimed in claim 1, wherein the control circuit is configured to change the coupling of the matrix of second detecting cells between the third grid distance and the second grid distance by connecting and disconnecting some of the second detecting cells with the control circuit.

* * * * *